(12) United States Patent
Hattori et al.

(10) Patent No.: US 6,187,282 B1
(45) Date of Patent: Feb. 13, 2001

(54) MANUFACTURING METHOD OF LITHIUM COMPLEX OXIDE COMPRISING COBALT OR NICKEL

(75) Inventors: Koji Hattori; Yasuhisa Yamashita, both of Shiga-ken; Yukio Sakabe, Kyoto, all of (JP)

(73) Assignee: Murata Manufacturing Co., Ltd. (JP)

( * ) Notice: Under 35 U.S.C. 154(b), the term of this patent shall be extended for 0 days.

(21) Appl. No.: 08/910,753

(22) Filed: Aug. 13, 1997

(30) Foreign Application Priority Data

| Aug. 13, 1996 | (JP) | 8-213434 |
| Aug. 13, 1996 | (JP) | 8-213435 |
| Apr. 14, 1997 | (JP) | 9-095616 |
| Apr. 14, 1997 | (JP) | 9-095617 |

(51) Int. Cl.$^7$ ................................................. C01G 49/00
(52) U.S. Cl. ...................... 423/594; 423/223; 429/231.95
(58) Field of Search ........................... 423/594; 429/223, 429/231.95

(56) References Cited

U.S. PATENT DOCUMENTS

| 4,567,031 | 1/1986 | Riley . | |
| 5,081,102 | * 1/1992 | Gay et al. ................................ | 501/1 |
| 5,110,696 | * 5/1992 | Shokoohi et al. .................... | 429/218 |
| 5,122,505 | * 6/1992 | Gusman et al. ......................... | 501/1 |
| 5,177,055 | * 1/1993 | Kinsman et al. ....................... | 501/1 |
| 5,264,201 | * 11/1993 | Dahn et al. ........................... | 429/594 |
| 5,370,948 | * 12/1994 | Hasegawa et al. ................... | 429/223 |
| 5,490,320 | * 2/1996 | Hasegawa et al. .................. | 29/623.1 |
| 5,599,642 | * 2/1997 | Toshiro et al. ......................... | 429/194 |
| 5,626,635 | * 5/1997 | Yamaura et al. ..................... | 29/623.5 |
| 5,629,110 | * 5/1997 | Kobayashi et al. .................. | 429/223 |
| 5,648,057 | * 7/1997 | Ueda et al. ............................ | 423/594 |
| 5,980,786 | * 11/1999 | Yamashita et al. ................ | 252/518.1 |

FOREIGN PATENT DOCUMENTS

WO94/25398    11/1994  (WO) .

OTHER PUBLICATIONS

Ohzuku, Tsutomu et al. "Electrochemistry and Structural Chemistry of LiNiO2 for 4 V Secondary Lithium Cells." J. Electrochem. Soc., vol. 140, No. 7., Jul. 1993.*

"Preparation of Spherical LiCoO$_2$ Powders by the Ultrasonic Spray Decomposition and Its Application to Cathode Active Material in Lithium Secondary Battery"; Journal of the Ceramic Society of Japan, International Edition 101 (1993) October, No. 10, Tokyo, pp. 1128–1132.

* cited by examiner

Primary Examiner—Tom Dunn
Assistant Examiner—Cam N. Nguyen
(74) Attorney, Agent, or Firm—Ostrolenk, Faber, Gerb & Soffen, LLP

(57) ABSTRACT

A method of manufacturing a lithium complex oxide involves the steps of 1) atomizing and pyrolyzing an aqueous or alcohol solution of metallic salt compounds constituting a lithium cobalt complex oxide or a lithium nickel complex oxide, and 2) annealing said lithium cobalt complex oxide or said lithium nickel complex oxide to increase the average particle diameter thereof to between about 1 and 5 micrometers and adjust the specific surface area thereof to between about 2 and 10 m$^2$/g. The lithium complex oxide provided by this method is homogeneous and enables a long cycle life to withstand repeated charging and discharging and a high level of storage stability to be realized when used as an cathode active material of a secondary lithium battery.

9 Claims, 1 Drawing Sheet

MANUFACTURING METHOD OF LITHIUM COMPLEX OXIDE COMPRISING COBALT OR NICKEL

BACKGROUND OF THE INVENTION

1. Technical Field of the Invention

This invention relates to a method of manufacturing a lithium complex oxide, especially a lithium cobalt complex oxide or a lithium nickel complex oxide, both of which are useful as, for example, a cathode active material of a secondary lithium battery.

2. Related Art of the Invention

As methods of manufacturing a lithium cobalt complex oxide or a lithium nickel complex oxide which are used as an cathode active material of a secondary lithium battery, the following methods have been proposed so far.

Lithium Cobalt Complex Oxide:

(a) A powder method in which, say, powders of lithium carbonate and cobalt oxide are mixed, and then fired at about 850° C.

(b) A spray-pyrolysis method in which lithium nitrate and cobalt nitrate are dissolved in water, and the solution is ultrasonically atomized for pyrolysis.

Lithium Nickel Complex Oxide:

(c) A solid-phase (powder) method in which powders of, say, lithium carbonate and nickel oxide are mixed, and then fired at about 750° C. in an oxygen gas stream.

(d) A method in which lithium nitrate or hydroxide and nickel hydroxide, each of which has low-melting point, are mixed with each other, and then fired at a low temperature in an oxygen gas stream.

(e) A spray-pyrolysis method in which lithium nitrate and nickel nitrate are dissolved in water, and their solution is ultrasonically atomized for pyrolysis.

However, the above methods involved the following problems.

The powders of carbonates and oxides used as the starting materials in the powder method (a) require firing at a relatively high temperature. As a result, heavy vaporization of lithium occurs, and there is obtained a product having a Li/Co molar ratio deviating from the desired range. It is impossible to mix the powders uniformly on a molecular basis, resulting, for example, in the formation of $Co_2O_3$ in addition to the $LiCoO_2$ desired, and in order to avoid this, it has been necessary to repeat extended time firing several times. The spray-pyrolysis method (b) makes it possible to mix elements forming a lithium cobalt complex oxide uniformly on an ionic basis and realize a drastically improved level of uniformity, as compared with the solid-phase method. It has also the advantage that, as it does not necessitate any step for crushing the raw materials, it can avoid the inclusion of impurities that would result from any crushing step.

However, a series of the steps in this spray-pyrolysis method including vaporization of the solvent and pyrolysis are conducted within short period of time, and the complex oxide which is thereby synthesized tends to be of low crystallinity since it has a very short heat history as compared with the product of conventional firing treatment. If it is used as an active material for a secondary battery, the repeated charging and discharging of the battery results in a broken crystal structure of the material and a lower battery capacity. Moreover, the complex oxide has a very large specific surface area on the order of several tens of square meters per gram, and the decomposition of an electrolyte contacting it brings about a serious lowering in the cycle life of the secondary battery and its storage stability.

The powders of carbonates and oxides used as the starting materials in the powder method (c) require firing at a relatively high temperature. As a result, like the method (a), vaporization of lithium occurs heavily, and there is obtained a product having a Li/Ni molar ratio deviating from the desired range. It is impossible to mix the powders uniformly on a molecular basis, resulting, for example, in the formation of $Li_2Ni_8O_{10}$ in addition to $LiNiO_2$ as desired, and in order to avoid this, it has been necessary to repeat extended time firing several times.

The method (d) gives a small deviation from the desired Li/Ni ratio, as compared with the solid-phase method, since it employs a lower temperature for synthesis. However, there is obtained a complex oxide of low crystallinity unless a long firing time is employed. If it is used as an active material for a secondary battery, the repeated charging and discharging of the battery results in a broken crystal structure of the material and a lower battery capacity. In the event that cations having a radius close to Ni ions, such as Fe, Co, Mn, Mg or Al, have been substituted for Ni in order to make a secondary battery having an improved cycle life to withstand repeated charging and discharging, it has been impossible to avoid a lack of uniformity in the distribution of Ni and substituted cations.

The spray-pyrolysis method (e) makes it possible to mix elements forming a complex oxide of lithium and nickel uniformly on an ionic basis, and realize a drastically improved level of uniformity, as compared with the other methods. It has also the advantage that, like the method (b), as it does not necessitate any step for crushing the raw materials, it can avoid the inclusion of impurities that would result from any crushing step. However, this spray-pyrolysis method has same problems as method (b) described before.

It is, therefore, an object of this invention to solve the above problems and provide a manufacturing method of a lithium complex oxide comprising cobalt or nickel which is homogeneous, and enables a long cycle life to withstand repeated charging and discharging and a high level of storage stability when used as an cathode active material of a secondary lithium battery.

SUMMARY OF THE INVENTION

The invention provides a manufacturing method of a lithium complex oxide comprising the steps of 1) atomizing and pyrolyzing an aqueous or alcohol solution of compounds containing metallic salts constituting a lithium cobalt complex oxide or a lithium nickel complex oxide, and 2) annealing said lithium cobalt complex oxide or said lithium nickel complex oxide to increase the average particle diameter thereof to between about 1 and 5 micrometers and adjust the specific surface area thereof to between about 2 and $10^2$/g.

In the above manufacturing method of a lithium complex oxide, the atomizing and pyrolyzing temperature is preferably between about 500 and 900° C., and more preferably about 600–800° C.

In the above manufacturing method of a lithium complex oxide, the annealing temperature is preferably between about 500 and 850° C., and more preferably about 600–800° C.

In the above manufacturing method of a lithium complex oxide, said lithium complex oxide may be $LiCoO_2$.

In the above manufacturing method of a lithium complex oxide, said lithium complex oxide may be $LiNiO_2$.

In the above manufacturing method of a lithium complex oxide, said compounds containing metallic salts may be inorganic acid salts.

The metallic salts may comprise a combination of at least one selected from the group of lithium nitrate, lithium acetate and lithium formate and at least one selected from the group of cobalt nitrate, cobalt acetate and cobalt formate.

If the aqueous and/or alcoholic solution of compounds containing metal elements for forming a lithium cobalt/nickel complex oxide is sprayed in a heated atmosphere, as stated above, it undergoes pyrolysis instantaneously and is finely divided by its own chemical decomposition to form a finely divided complex oxide of high surface activity. Then, the complex oxide is annealed to produce a complex oxide of high surface activity having a particle diameter of about 1–5 micrometers and a specific surface area of about 2–10 $m^2/g$ which is suitable as an cathode active material of a secondary lithium battery.

The lithium cobalt complex oxide and the lithium nickel complex oxide according to this invention are not limited to $LiCoO_2$ and $LiNiO_2$, respectively. The lithium cobalt/nickel complex oxide also includes any product obtained by substituting, for example, Cr, Mn, Fe, Ni/Co, Mg or Al for a part of Co/Ni to realize improved properties. Thus, the metal elements forming a lithium cobalt/nickel complex oxide according to this invention are not only Li and Co/Ni, but also include Cr, Mn, Fe, Ni/Co, Mg and Al. Typical water-soluble compounds thereof include acetates, formates, nitrates and chlorides. These compounds, such as acetates, formates, nitrates and chlorides, have an industrial advantage since they are by far less expensive than organic compounds having metal ions substituted for hydrogen ions in the molecule, such as alkoxides, and make it possible to keep the cost of raw materials at a low level.

A mode of carrying out this invention will now be described by way of examples in which $LiCoO_2$ was produced as a lithium cobalt complex oxide, and $LiNiO_2$ was produced as a lithium nickel complex oxide.

DETAILED DESCRIPTION OF THE INVENTION

DESCRIPTION OF PREFERRED EMBODIMENTS

Figure 1:
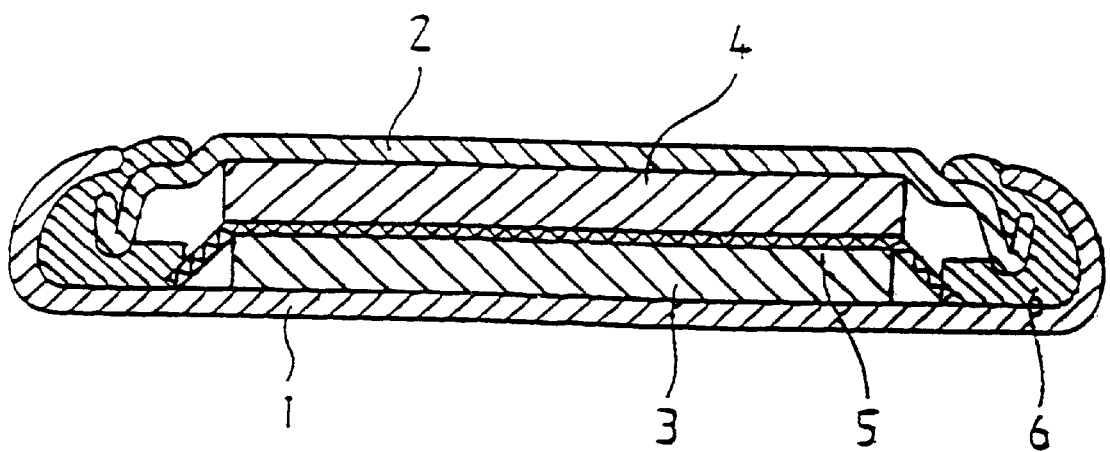
FIG. 1 is a sectional view showing a secondary lithium battery by way of example.

1. Examples of a Lithium Cobalt Complex Oxide

Lithium nitrate, lithium acetate, lithium formate, cobalt nitrate, cobalt acetate and cobalt formate were prepared as metal compounds for forming $LiCoO_2$. The compounds were used as raw materials in the combinations shown in Table 1, were weighed accurately as to give a molar Li:Co ratio of 1:1, and put in a vessel, and 1000 ml of a mixture of water and alcohol having a ratio of 1:1 (by volume) was added and stirred to dissolve the compounds and form a mixed solution.

The mixed solution was sprayed into a vertical pyrolysis furnace having a controlled temperature between 400° C. and 900° C. through a nozzle at a rate of 1200 ml/h, whereby it was thermally decomposed to give a complex oxide powder. Then, the complex oxide was put in an alumina sagger and annealed at an appropriate temperature between 500° C. and 900° C. for two hours, whereby samples of $LiCoO_2$ shown as Nos. 1 to 16 in Table 1 were obtained.

$LiCoO_2$ was also made by another synthesizing method as a comparative example, and is shown as Sample No. *17 in Table 1. Lithium carbonate and cobalt oxide were prepared as the starting materials. They were weighed accurately as to give a molar Li:Co ratio of 1:1, were crushed and mixed in a ball mill, and their mixture was fired at 850° C. for two hours to yield a complex oxide.

A photograph was taken through a scanning electron microscope (SEM) of each sample of the complex oxide powder obtained, and its particle diameter was determined therefrom. The specific surface area of the complex oxide was determined by nitrogen adsorption. The identification of the complex oxide was carried out by X-ray diffraction (XRD) analysis. The results are shown in Table 1. In Table 1, LC means $LiCoO_2$, and CO means $Co_2O_3$. Also in this Table, and all other Tables, samples marked * are outside the scope of the invention.

TABLE 1

| Sample No. | Starting Matrial (lithium) | Starting Material (Cobalt) | Atomizing Temp. (° C.) | Annealing Temp. (° C.) | Average Particle Diameter (micrometer) | Specific Surface Area ($m^2/g$) | XRD Analysis Phase |
|---|---|---|---|---|---|---|---|
| *1 | lithium nitrate | cobalt nitrate | 400 | 800 | 2.3 | 6.3 | CO,LC |
| 2 | lithium nitrate | cobalt nitrate | 500 | 800 | 2.4 | 2.7 | LC |
| 3 | lithium nitrate | cobalt nitrate | 600 | 800 | 2.6 | 2.9 | LC |
| 4 | lithium nitrate | cobalt nitrate | 800 | 800 | 2.5 | 3.5 | LC |

TABLE 1-continued

| Sample No. | Starting Matrial (lithium) | Starting Material (Cobalt) | Atomizing Temp. (° C.) | Annealing Temp. (° C.) | Average Particle Diameter (micrometer) | Specific Surface Area (m²/g) | XRD Analysis Phase |
|---|---|---|---|---|---|---|---|
| 5 | lithium nitrate | cobalt nitrate | 900 | 800 | 2.8 | 2.5 | LC |
| *6 | lithium nitrate | cobalt nitrate | 800 | 500 | 1.6 | 33.2 | LC |
| 7 | lithium nitrate | cobalt nitrate | 800 | 600 | 2.3 | 9.6 | LC |
| 8 | lithium nitrate | cobalt nitrate | 800 | 850 | 2.6 | 2.6 | LC |
| *9 | lithium nitrate | cobalt nitrate | 800 | 900 | 7.9 | 0.6 | LC,CO |
| 10 | lithium acetate | cobalt acetate | 800 | 800 | 1.1 | 4.3 | LC |
| 11 | lithium formate | cobalt formate | 800 | 800 | 1.7 | 4.2 | LC |
| 12 | lithium nitrate | cobalt formate | 500 | 800 | 1.8 | 2.9 | LC |
| 13 | lithium nitrate | cobalt formate | 600 | 800 | 2.0 | 3.1 | LC |
| 14 | lithium nitrate | cobalt formate | 800 | 800 | 1.9 | 3.7 | LC |
| 15 | lithium nitrate | cobalt formate | 900 | 800 | 2.2 | 2.7 | LC |
| 16 | lithium nitrate | cobalt formate | 800 | 600 | 1.7 | 9.8 | LC |
| *17 | lithium carbonate | cobalt oxide | 850 (Solid-phase method) | | 9.61 | 0.4 | LC |

A secondary battery was made by using each complex oxide sample as its active cathode material. The complex oxide powder was kneaded with acetylene black as an electric conducting agent and polytetrafluoroethylene as a binder, and a sheet was formed from their mixture, and bonded under pressure to a stainless steel mesh to make the cathode.

The cathode 3 and metallic lithium as an anode 4 were put together with a polypropylene separator 5 interposed therebetween, with the stainless steel mesh of the cathode 3 positioned outwardly, and were placed in a stainless steel cathode can 1 with the cathode 3 down, as shown in FIG. 1. The separator 5 was impregnated with an electrolyte. The electrolyte was a solution of lithium perchlorate in a mixed solvent composed of propylene carbonate and 1,1-dimethoxyethane. Then, the opening of the cathode can 1 was closed with a stainless steel anode plate 2 and an insulating packing 6, whereby the secondary lithium battery shown in Table 2 was made.

Each secondary lithium battery obtained was subjected to 100 cycles of charging and discharging employing a current density of 0.5 mA/cm² for charging and discharging, and ending its charging at a voltage of 4.2 V and discharging at a voltage of 3.0 V. After the tests, the secondary battery was disassembled, and its cathode was visually inspected for any peeling. The results are shown in Table 2.

TABLE 2

| Sample No. | Initial discharge capacity (mAh/g) | Discharge capacity (mAh/g) after 100 cycles | Peeling of cathode |
|---|---|---|---|
| *1 | 96 | 72 | Yes (a little) |
| 2 | 131 | 127 | No |
| 3 | 135 | 133 | No |
| 4 | 140 | 134 | No |
| 5 | 135 | 131 | No |
| *6 | 136 | 104 | Yes |
| 7 | 133 | 126 | No |
| 8 | 131 | 129 | No |
| *9 | 116 | 110 | No |
| 10 | 125 | 117 | No |
| 11 | 126 | 117 | No |
| 12 | 130 | 126 | No |
| 13 | 134 | 132 | No |
| 14 | 139 | 133 | No |
| 15 | 134 | 130 | No |
| 16 | 132 | 125 | No |
| *17 | 114 | 103 | No |

As is obvious from the results shown in Table 1, the spray pyrolysis of a solution containing metal elements forming a lithium cobalt complex oxide and the annealing of its product yield a complex oxide having a particle diameter of about 1–5 micrometers, preferably about 1.1–3 micrometers, and a specific surface area of about 2–10 m²/g, preferably about 2.5–9.6 m²/g. This complex oxide is a single phase of $LiCoO_2$. The use of any such complex oxide as an active cathode material makes it possible to obtain a secondary lithium battery having a long cycle life and free from any deterioration, such as electrode peeling, as shown in Table 2.

A specific range of preferred spray-pyrolysis temperatures is about 500–900° C. A single phase of lithium cobalt complex oxide can be produced at a temperature of about 500° C. or above. Its upper limit is defined by the temperature below which the lithium cobalt complex oxide produced is not decomposed by heat.

A specific range of preferred annealing temperatures is about 500–850° C. At any temperature below about 500° C., it is impossible to cause the lithium cobalt complex oxide produced by pyrolysis to grow satisfactorily in crystallinity and particle diameter to give an improved cycle life and an improved storage stability to a secondary battery. If the annealing temperature exceeds about 850° C., however, the particle diameter of the lithium cobalt complex oxide become too large for an active cathode material for a secondary battery, causing a low capacity.

Although the foregoing description of the examples has been of the cases where the compounds of metal elements forming $LiCoO_2$ are nitrates, acetates or formates, it is not intended for limiting the scope of this invention to such cases. This invention does not preclude the use of other water- or alcohol-soluble compounds, such as chlorides.

When lithium nitrate is used as the lithium compound, or one of the compounds of metal elements forming $LiCoO_2$, and cobalt formate as the other, or a cobalt compound, as in the case of Sample No. 14, it is possible to obtain a higher discharge capacity than when lithium acetate and cobalt acetate are used as in the case of Sample No. 10, or when lithium formate and cobalt formate are used as in the case of Sample No. 11, and a high discharge capacity which is comparable to what is obtained when lithium nitrate and cobalt nitrate are used as in the case of Sample No. 4. Further, when lithium nitrate and cobalt formate are used, used the reaction as shown by formula (1) takes place, and produces exhaust gases which contain only ⅓ of the amount of $NO_2$ produced by the reaction of lithium nitrate and cobalt nitrate as shown by formula (2). Therefore, it is easier to dispose of the gases. Thus, the most preferable combination of compounds of metal elements forming $LiCoO_2$ is of lithium nitrate and cobalt formate.

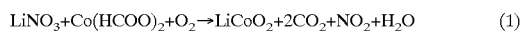

$$LiNO_3 + Co(HCOO)_2 + O_2 \rightarrow LiCoO_2 + 2CO_2 + NO_2 + H_2O \quad (1)$$

$$LiNO_3 + Co(NO_3)_2 \rightarrow LiCoO_2 + 3NO_2 + 0.5O_2 \quad (2)$$

Similar results can be obtained from cases employing a lithium cobalt complex oxide other than $LiCoO_2$, as obtained by substituting, for example, Cr, Mn, Fe, Ni, Mg or Al for a part of the Co sites in $LiCoO_2$.

2. Examples of a Lithium Nickel Complex Oxide

Lithium nitrate, lithium acetate, lithium formate, nickel nitrate, nickel acetate and nickel formate were prepared as metal compounds for forming $LiNiO_2$. The compounds were used in the combinations shown in Table 3 as raw materials, and were weighed accurately as to give a molar Li:Ni ratio of 1:1, put in a vessel, and 1000 ml of a mixture of water and alcohol having a ratio of 1:1 (by volume) was added, and stirred to dissolve them and form a mixed solution.

The mixed solution was sprayed into a vertical pyrolysis furnace having a controlled temperature between 400° C. and 900° C. through a nozzle at a rate of 1200 ml/h, whereby it was thermally decomposed to give a complex oxide powder. Then, the complex oxide was put in an alumina sagger, and annealed at an appropriate temperature between 500° C. and 900° C. for two hours, whereby samples of $LiNiO_2$ shown at Nos. 1 to 16 in Table 3 were obtained.

$LiNiO_2$ was also made by another synthesizing method as a comparative example, and is shown as Sample No. *117 in Table 3. Lithium hydroxide and nickel hydroxide were prepared as the starting materials. They were weighed accurately as to give a molar Li:Ni ratio of 1:1, crushed and mixed in a ball mill, and their mixture was fired at 750° C. for two hours in an oxygen gas stream to yield a complex oxide.

A photograph was taken through a scanning electron microscope (SEM) of each sample of the complex oxide powder as obtained, and its particle diameter was determined therefrom. The specific surface area of the complex oxide was determined by nitrogen adsorption. The identification of the complex oxide was carried out by X-ray diffraction (XRD) analysis. The results are shown in Table 3. In Table 3, LN means $LiNiO_2$, and NO means $Li_2Ni_8O_{10}$.

TABLE 3

| Sample No. | Starting Matrial (lithium) | Starting Material (Cobalt) | Atomizing Temp. (° C.) | Annealing Temp. (° C.) | Average Particle Diameter (micrometer) | Specific Surface Area (m²/g) | XRD Analysis Phase |
|---|---|---|---|---|---|---|---|
| 101 | lithium nitrate | nickel nitrate | 400 | 800 | 2.4 | 5.4 | NO,LN |
| 102 | lithium nitrate | nickel nitrate | 500 | 800 | 2.4 | 2.8 | LN |
| 103 | lithium nitrate | nickel nitrate | 600 | 800 | 2.5 | 3.1 | LN |
| 104 | lithium nitrate | nickel nitrate | 800 | 800 | 2.3 | 3.2 | LN |
| 105 | lithium nitrate | nickel nitrate | 900 | 800 | 2.8 | 2.6 | LN |
| *106 | lithium nitrate | nickel nitrate | 800 | 500 | 1.8 | 27.3 | LN |
| 107 | lithium nitrate | nickel nitrate | 800 | 600 | 2.2 | 9.4 | LN |
| 108 | lithium nitrate | nickel nitrate | 800 | 850 | 2.5 | 2.4 | LN |
| *109 | lithium nitrate | nickel nitrate | 800 | 900 | 7.4 | 0.7 | LN,LO |

| | | | | | | | |
|---|---|---|---|---|---|---|---|
| 110 | lithium acetate | nickel acetate | 800 | 800 | 1.2 | 4.2 | LN |
| 111 | lithium formate | nickel formate | 800 | 800 | 1.8 | 4.1 | LN |
| 112 | lithium nitrate | nickel formate | 500 | 800 | 1.9 | 2.8 | LN |
| 113 | lithium nitrate | nickel formate | 600 | 800 | 2.0 | 3.0 | LN |
| 114 | lithium nitrate | nickel formate | 800 | 800 | 1.9 | 3.7 | LN |
| 115 | lithium nitrate | nickel formate | 900 | 800 | 2.3 | 2.4 | LN |
| 116 | lithium nitrate | nickel formate | 800 | 600 | 1.8 | 9:3 | LN |
| *117 | lithium nitrate | nickel oxide | 850 (Solid-phase method) | | 8.9 | 0.5 | LN |

A secondary battery was made by using each complex oxide sample as its active cathode material. The complex oxide powder was kneaded with acetylene black as an electric conducting agent and polytetrafluoroethylene as a binder, and a sheet was formed from their mixture, and bonded under pressure to a stainless steel mesh to make the cathode.

The cathode 3 and metallic lithium as an anode 4 were put together with a polypropylene separator 5 interposed therebetween and with the stainless steel mesh of the cathode 3 positioned outwardly, and were placed in a stainless steel cathode can 1 with the cathode 3 down, as shown in FIG. 1.

The separator 5 was impregnated with an electrolyte. The electrolyte was a solution of lithium perchlorate in a mixed solvent composed of propylene carbonate and 1,1-dimethoxyethane. Then, the opening of the cathode can 1 was closed with a stainless steel anode plate 2 and an insulating packing 6, whereby a secondary lithium battery as shown in Table 4 was made.

Each secondary lithium battery as obtained was subjected to 100 cycles of charging and discharging by employing a current density of 0.5 mA/cm$^2$ for charging and discharging, and ending its charging at a voltage of 4.2 V and its discharging at a voltage of 3.0 V. After the tests, the secondary battery was disassembled, and its cathode was visually inspected for any peeling. The results are shown in Table 4.

TABLE 4

| Sample No. | Initial discharge capacity (mAh/g) | Discharge capacity (mAh/g) after 100 cycles | Peeling of cathode |
|---|---|---|---|
| *101 | 120 | 90 | Yes (a little) |
| 102 | 164 | 159 | No |
| 103 | 169 | 166 | No |
| 104 | 173 | 168 | No |
| 105 | 168 | 164 | No |
| *106 | 168 | 130 | Yes |
| 107 | 166 | 157 | No |
| 108 | 169 | 167 | No |
| *109 | 146 | 138 | No |
| 110 | 155 | 145 | No |
| 111 | 156 | 145 | No |
| 112 | 163 | 158 | No |
| 113 | 168 | 165 | No |
| 114 | 172 | 167 | No |
| 115 | 167 | 163 | No |
| 116 | 165 | 156 | No |
| *117 | 142 | 129 | No |

As is obvious from the results shown in Table 3, the spray pyrolysis of a solution containing metal elements forming a lithium nickel complex oxide and the annealing of its product yield a complex oxide having a grown particle diameter of about 1–5 micrometers and a specific surface area of about 2–10 m$^2$/g. This complex oxide is a single phase of LiNiO$_2$. The use of any such complex oxide as an active cathode material makes it possible to obtain a secondary lithium battery having a long cycle life and free from deterioration, such as electrode peeling, as shown in Table 4.

A specific range of preferred spray-pyrolysis temperatures is about 500–900° C. A single phase of a lithium nickel complex oxide can be produced at a temperature of about 500° C. or above. Its upper limit is defined by the temperature below which the lithium nickel complex oxide as produced is not decomposed by heat.

A specific range of preferred annealing temperatures is about 500–850° C. At any temperature below about 500° C., it is impossible to cause the lithium nickel complex oxide produced by pyrolysis to grow satisfactorily in crystallinity and particle diameter to give an improved cycle life and an improved storage stability to a secondary battery. If the annealing temperature exceeds about 850° C., however, the particle diameter of the lithium nickel complex oxide become too large for an active cathode material for a secondary battery, causing a low capacity.

Although the foregoing description of the examples has been of the cases where the compounds of metal elements forming LiNiO$_2$ are their nitrates, acetates or formates, it is not intended to limit the scope of this invention to such cases. This invention does not preclude the use of other water- or alcohol-soluble compounds, such as chlorides.

When lithium nitrate is used as the lithium compound, or one of the compounds of metal elements forming LiNiO$_2$, and nickel formate as the other, or a nickel compound, as in the case of Sample No. 114, it is possible to obtain a higher discharge capacity than when lithium acetate and nickel acetate are used as in the case of Sample No. 110, or when lithium formate and nickel formate are used as in the case of Sample No. 111, and a high discharge capacity comparable to what is obtained when lithium nitrate and nickel nitrate are used as in the case of Sample No. 104. Further, when lithium nitrate and nickel formate are used, moreover, a reaction as shown by formula (1) takes place, and produces exhaust gases which contain only ⅓ of the amount of $NO_2$ produced by the reaction of lithium nitrate and nickel nitrate as shown by formula (2). Therefore, it is easier to dispose of the gases. Thus, the most preferable combination of compounds of metal elements forming $LiNiO_2$ is of lithium nitrate and nickel formate.

$$LiNO_3 + Ni(HCOO)_2 + O_2 \rightarrow LiNiO_2 + 2CO_2 + NO_2 + H_2O \quad (1)$$

$$LiNO_3 + Ni(NO_3)_2 \rightarrow LiNiO_2 + 3NO_2 + 0.5O_2 \quad (2)$$

Similar results can be obtained from cases employing a lithium nickel complex oxide other than $LiNiO_2$, as obtained by substituting, for example, Cr, Mn, Fe, Co, Mg or Al for a part of the Ni sites in $LiNiO_2$.

As is obvious from the foregoing description, the manufacturing method of this invention makes it possible to obtain a lithium cobalt complex oxide and a lithium nickel complex oxide each of which is homogeneous and has a particle diameter of about 1–5 micrometers and a specific surface area of about 2–10 $m^2/g$.

The use of this complex oxide as an cathode active material of a secondary battery makes it possible to obtain a secondary lithium battery having a long cycle life to withstand repeated charging and discharging and a high level of storage stability.

What is claimed is:

1. A method of manufacturing a lithium complex oxide comprising the steps of: (a) atomizing and pyrolyzing an aqueous or alcohol solution lithium nitrate and at least one of cobalt formate and nickel formate by spray-pyrolysis to obtain a lithium-(cobalt/nickel) complex oxide powder, and (b) annealing the lithium-(cobalt/nickel) complex oxide powder thus formed for a time sufficient to increase the average particle diameter thereof to between about 1 and 5 micrometers and adjust the specific surface area thereof to between about 2 and 10 $m^2/g$.

2. A method of manufacturing a lithium complex oxide according to claim 1, characterized in annealing the lithium-(cobalt/nickel) complex oxide powder formed to increase the average particle diameter thereof to between about 1.1 and 3 micrometers and adjust the specific surface area thereof to between about 2.5 and 9.6 $m^2/g$.

3. A method of manufacturing a lithium complex oxide according to claim 1, characterized in that said salts contain lithium and cobalt/nickel in a molar ratio of about 1:1.

4. A method of manufacturing a lithium complex oxide according to claim 1, characterized in that the atomizing and pyrolyzing temperature is between about 500 and 900° C.

5. A method of manufacturing a lithium complex oxide according to claim 4, characterized in that the annealing temperature is between about 500 and 850° C.

6. A method of manufacturing a lithium complex oxide according to claim 5, characterized in that the atomizing the pyrolyzing temperature is between about 560 and 800° C.

7. A method of manufacturing a lithium complex oxide according to claim 6, characterized in that the annealing temperature is between about 600 and 800° C.

8. A method of manufacturing a lithium complex oxide according to claim 7, characterized in annealing the lithium-(cobalt/nickel) complex oxide formed to increase the average particle diameter thereof to between about 1.1 and 3 micrometers and adjust the specific surface area thereof to between about 2.5 and 9.6 $m^2/g$.

9. A method of manufacturing a lithium complex oxide according to claim 8, characterized in that said salts contain lithium and cobalt/nickel in a molar ratio of about 1:1.

* * * * *